(12) United States Patent
Gentili

(10) Patent No.: US 12,021,957 B2
(45) Date of Patent: Jun. 25, 2024

(54) METHOD, SYSTEM, AND CIRCUITS FOR RF LOW-LATENCY, MULTIPLE PRIORITY COMMUNICATION USING DEFINED TRANSMISSION WINDOWS

(71) Applicant: STMICROELECTRONICS, INC., Coppell, TX (US)

(72) Inventor: Maurizio Gentili, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 168 days.

(21) Appl. No.: 17/542,274

(22) Filed: Dec. 3, 2021

(65) Prior Publication Data

US 2023/0179392 A1 Jun. 8, 2023

(51) Int. Cl.
*H04L 7/00* (2006.01)

(52) U.S. Cl.
CPC ................. *H04L 7/0008* (2013.01)

(58) Field of Classification Search
CPC .......... H04L 7/0008; G07F 17/32; H04B 1/40
See application file for complete search history.

(56) References Cited

U.S. PATENT DOCUMENTS

| | | | |
|---|---|---|---|
| 7,352,770 | B1 | 4/2008 | Yonge, III et al. |
| 7,916,746 | B2 | 3/2011 | Yonge, III et al. |
| 8,396,021 | B2 | 3/2013 | Lum et al. |
| 9,233,300 | B2 | 1/2016 | Peng et al. |
| 2006/0084504 | A1 | 4/2006 | Chan et al. |
| 2020/0068428 | A1 | 2/2020 | Meylan et al. |
| 2021/0160187 | A1 | 5/2021 | Mitra et al. |
| 2021/0212153 | A1* | 7/2021 | Siomina ................ H04W 76/28 |

FOREIGN PATENT DOCUMENTS

DE 102009006907 A1 8/2010
WO WO 0205492 A1 1/2002

OTHER PUBLICATIONS

Mipi Alliance, "Low Latency Interface (LLI) v2.1," Technology Brief, 2014, 2 pages, «https://www.mipi.org/sites/default/files/LLI_Spec_Brief_2014_FINAL.pdf».
Mipi Alliance, "New Low Latency Interface Specification Eliminates Memory Chip," Powerpoint, Mobile World Congress, Barcelona, Spain, Feb. 29, 2012, 15 pages.

* cited by examiner

*Primary Examiner* — Jamal Javaid
(74) *Attorney, Agent, or Firm* — Seed IP Law Group LLP

(57) ABSTRACT

System, method, and circuitry for utilizing a synchronization message to create fixed transmission windows for multiple priority data in half-duplex communication systems. A first computing device includes a first master controller and a first slave radio, and a second computing device includes a second slave controller and a second master radio. The first controller and the second radio may share a transmit mode during a transmission window, and the first radio and the second controller radio may share a receive mode during that same transmission window, which are defined by the synchronization message. The first controller can transmit outbound data to the first radio, the second radio can transmit outbound data to the second controller, and the second radio can transmit inbound data to the first radio during this transmission window.

21 Claims, 9 Drawing Sheets

METHOD, SYSTEM, AND CIRCUITS FOR RF LOW-LATENCY, MULTIPLE PRIORITY COMMUNICATION USING DEFINED TRANSMISSION WINDOWS

BACKGROUND

Technical Field

The present disclosure generally relates to electronic devices of the type often used in embedded applications. More particularly, but not exclusively, the present disclosure relates to transmitting data between such electronic devices.

Description of the Related Art

Many electronic devices utilize a remote control or perform some other types of communications. For example, gaming consoles generally utilize a hand controller to manipulate and control various features and functions of the gaming console. Sometimes these hand controllers communicate with the gaming console via a wired connection. But often hand controllers communicate with the gaming console via a wireless connection. Historically, information, such as button pushes, were sent from the hand controller to the gaming console to control the console. However, newer hand controllers are much more sophisticated and often utilize two-way communications with the gaming console. For example, the gaming console may transmit game audio and haptic interface commands to the hand controller. The hand controller can in turn output the game audio through a speaker on the hand controller or through headphones that are connected to the hand controller. The hand controller can transmit user-input commands and user audio captured by a microphone connected to the hand controller to the gaming console. This bi-directional transmission, however, can be difficult due to the types of data being transmitted and delays that can occur during transmission. It is with respect to these and other considerations that the embodiments described herein have been made.

BRIEF SUMMARY

Embodiments described herein utilize a fixed transmission windows to enable electronic devices to transmit different priority data of different types to one another. For example, a first computing device includes first circuitry and second circuitry, and a second computing device includes third circuitry and fourth circuitry.

The first circuitry may be configured to transmit a synchronization message to the second circuitry. The synchronization message defines the fixed transmission windows, including the transmission window length. First audio data and first control are selected to transmit to the second computing device based on a first priority for audio data relative to a second priority for control data and on the transmission window length, where the second priority is higher than the first priority. During a first transmission window, the first circuitry transmits the selected first audio data and the selected first control data to the second circuitry.

The second circuitry may be configured to transmit the synchronization message to the third circuitry. During the first transmission window, the second circuitry receives the selected first audio data and the selected first control data from the first circuitry. During a second transmission window, the second circuitry transmits the selected first audio data and the selected first control data to the third circuitry.

The third circuitry may be configured to transmit the synchronization message to the fourth circuitry. During the second transmission window, the third circuitry receives the selected first audio data and the selected first control data from the second circuitry. And during the third transmission window, the third circuitry transmits the selected first audio data and the selected first control data to the fourth circuitry and transmits the selected second audio data and the selected second control data to the second circuitry.

The fourth circuitry may be configured to receive the selected first audio data and the selected first control data from the third circuitry during the third transmission window.

Embodiments described herein result in an efficient bi-directional transmission of audio and control data using half-duplex radios, where the control data has a higher priority than the audio data, which can result in faster transmission and less loss of high priority data.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views, unless the context indicates otherwise. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following description, along with the accompanying drawings, certain details are set forth in order to provide a thorough understanding of various embodiments of devices, systems, methods, and articles. One of skill in the art, however, will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, memories, bus systems, etc., have not been shown or described in detail in some figures to avoid unnecessarily obscuring descriptions of the embodiments. Moreover, well-known structures or components that are associated with the environment of the present disclosure, including but not limited to the communication systems and networks, have not been shown or described in order to avoid unnecessarily obscuring descriptions of the embodiments.

Unless the context requires otherwise, throughout the specification and claims that follow, the word "comprise" and variations thereof, such as "comprising," and "comprises," are to be construed in an open, inclusive sense, that is, as "including, but not limited to."

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references. Furthermore, the particular features, structures, or characteristics may be combined in any suitable manner in one or more embodiments to obtain further embodiments.

Figure 1:
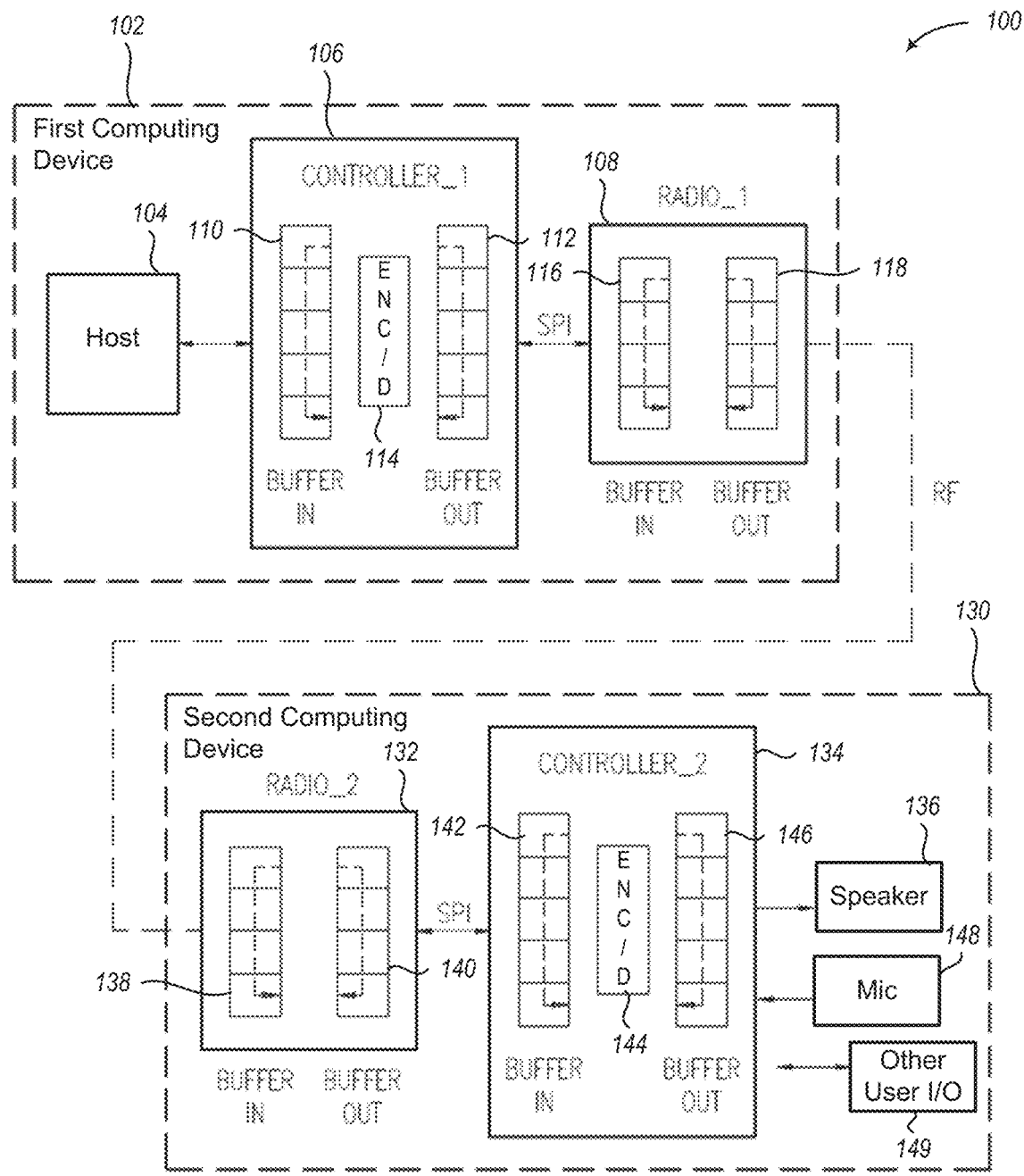
FIG. 1 is a block diagram showing an example computing environment for implementing embodiments described herein.

FIG. 1 is a block diagram showing an example computing environment 100 for implementing embodiments described herein. Environment 100 includes a first computing device 102 and a second computing device 130. The first computing device 102 includes a host 104, a first controller 106, and a first radio 108. The second computing device 130 includes a second radio 132, a second controller 134, a speaker 136, a microphone 148, and other user input/output interface 149. In various embodiments, the radios 108 and 132 are half-duplex radios such that each radio is in a listen mode or transmit mode and only one radio can be transmitting at a time. In various embodiments, the other user input/output interface 149 may include control buttons, haptic interfaces, visual displays, touch screens, or other user interfaces.

The host 104 may be a personal computer, gaming console, or other computing device that is to send and receive audio data and control data to and from the second computing device 130. In some embodiments, the host 104 may be imbedded in or part of the first computing device 102. In other embodiments, the host 104 may be a computing device that is separate from the first computing device 102. Likewise, in some embodiments, one or more of the speaker 136 or the microphone 148 or the other user input/output interface 149 may be imbedded in or part of the second computing device 130. And in other embodiments, one or more of the speaker 136 or the microphone 148 or the other user input/output interface 149 may be separate from the second computing device 130.

Briefly, data obtained sent from the first computing device 102 to the second computing device 130 may be referred to as outbound data and data sent from the second computing device 130 to the first computing device 102 may be referred to as inbound data. To coordinate the transmission of data, the first controller 106 and the second radio 132 are considered to be master components, and the first radio 108 and the second controller 134 are considered to be slave components. In this way, the first controller 106 is a master of the first radio 108, the first radio 108 is a slave of the first controller 106, the second radio 132 is a master of the second controller 134, and the second controller 134 is a slave of the second radio 132. In some embodiments, the first controller 106, the first radio 108, the second radio 132, and the second controller may be referred to as nodes. In at least one such embodiment, the first controller 106 and the second radio 132 are master nodes and the first radio 108 and the second controller 134 are slave nodes.

The first controller 106, the first radio 108, the second controller 132, and the second radio 134 share a clock-synchronization message to define when each component is in a transmit mode and when each component is in a receive mode. The clock-synchronization message defines alternating transmission windows in which both master components are in transmit mode at during a same transmission window and both slave components are in transmit mode during a same subsequent transmission window. Accordingly, when both master components are in transmit mode (referred to as master transmit mode) during a transmission window, both slave components are in receive mode (referred to as slave receive mode) during that same transmission window. Conversely, when both master components are in receive mode (referred to as master receive mode) during a transmission window, both slave components are in transmit mode (referred to as slave transmit mode) during that same transmission window.

As such, during a first transmission window, the first controller 106 and the second radio 132 are in a master transmit mode and the first radio 108 and the second controller 134 are in a slave receive mode. Then, during a second transmission window after the first transmission window, the first controller 106 and the second radio 132 are in a master receive mode and the first radio 108 and the second controller 134 are in a slave transmit mode. These components alternate modes from one transmission window to the next based on the clock-synchronization message.

For example, during a master transmit mode (slave receive mode), the first controller 106 can transmit outbound data to the first radio 108, the second radio 132 can transmit inbound data to the first radio 108 and transmit outbound data to the second controller 132, the first radio 108 can receive the outbound data from the first controller 106 and receive the inbound data from the second radio 132, and the second controller 132 can receive the outbound data from the second radio 132. Conversely, during a master receive mode (slave transmit mode), the first controller 106 can receive inbound data from the first radio 108, the second radio 132 can receive outbound data from the first radio 108 and receive inbound data from the second controller 132, the first radio 108 can transmit the inbound data to the first controller 106 and transmit the outbound data to the second radio 132, and the second controller 132 can transmit the inbound data to the second radio 132.

In various embodiments, the first controller 106 defines, maintains, updates, and coordinates the clock-synchronization message with the first radio 108, which in turn provides the clock-synchronization message to the second radio 132, which then provides the clock-synchronization message to the second controller 134. In some embodiments, the clock-synchronization message defines a start time of a first transmission window, a transmission window length, and whether the first transmission window is a master transmit mode (slave receive mode) or is a master receive mode (slave transmit mode).

The first controller 106 of the first computing device 102 includes multiple inbound buffers 110, multiple outbound buffers 112, and an encoder/decoder 114. The first radio 108 of the first computing device 102 includes multiple inbound buffers 116 and multiple outbound buffers 118. The outbound buffers 112 and 118 include separate buffers for audio data and control data that are to be sent to the second computing device 130, and the inbound buffers 110 and 116 include separate buffers for audio data and control data that are received from the second computing device 130.

The first controller 106 receives, from the host 104, audio data or control data that is to be transmitted to the second computing device 130. The first controller 106 may encode the audio data using the encoder/decoder 114. The control data and encoded audio data (or unencoded data) that is to be transmitted to the second computing device 130 may be referred to as outbound data. The first controller 106 stores the outbound data in at least one buffer of outbound buffers 112. During a transmission window in which the first controller 106 is in a master transmit mode, the first controller 106 can provide the outbound data to the first radio 108.

The first radio 108 receives the outbound data from the first controller 106 during the same transmission window while the first radio is in a corresponding slave receive mode. The first radio 108 stores the outbound data in at least one buffer of the outbound buffer 118 prior to transmission to the second computing device 130.

The first radio 108 forwards the clock-synchronization message to the second radio 132 of the second computing device 130, which, as discussed herein, is used to coordinate the timing and transmission windows for the master transmit modes/slave receive modes with the master receive modes/slave transmit modes. The transmission of the outbound data is discussed in more detail below. Briefly, the first radio 108 of the first computing device 102 selects audio data or control data based on the priority of the data and transmits the selected outbound data to the second computing device 130 during a transmission window in which the first radio 108 is in a slave transmit mode that is defined by the clock-synchronization message.

The second controller 134 of the second computing device 130 includes multiple inbound buffers 142, multiple outbound buffers 146, and an encoder/decoder 144. The second radio 132 of the second computing device 130 includes multiple inbound buffers 138 and multiple outbound buffers 140. The outbound buffers 146 and 140 include separate buffers for audio data and control data that are received from the first computing device 102 and to be output via speaker 136 or to control other components (not illustrated) or functions of the second computing device 130. The inbound buffers 142 and 138 include separate buffers for audio data and control data that are received via the microphone 148 or input via controls and are to be sent from the second computing device 130 to the first computing device 102.

The second radio 132 receives the clock-synchronization message from the first radio 108 and forwards the clock-synchronization message to the second controller 134. The second radio 132 of the second computing device 130 receives the transmitted outbound data from the first computing device 102 during a corresponding transmission window in which the second radio 132 is in a master receive mode defined by the clock-synchronization message. The second radio 132 stores the outbound data in at least one buffer of outbound buffers 140. The second radio 132 then provides the outbound data to the second controller 134 during a subsequent transmission window when the second radio 132 is in a master transmit mode that is defined by the clock-synchronization message.

The second controller 134 receives the outbound data from the second radio 132 during the corresponding transmission window when the second controller 134 is in a slave receive mode. The second controller 134 stores the outbound data in at least one buffer of outbound buffers 146. The second controller 134 can decode the encoded outbound audio data using the encoder/decoder 144. The second controller 134 may provide the outbound audio data to the speaker 136. The second controller 134 may also utilize or output one or more controls or commands based on the outbound control data to control one or more functions or other components (not illustrated) of the second computing device 130. Examples of such controls may include, for example, haptic interfaces, display interfaces, lights, or other types of output.

The second controller 134 may also receive audio data from the microphone 148 or control data from at least one user input control (not illustrated) that are to be transmitted to the first computing device 102. Examples of the input control may include one or more user input buttons, camera input, or other types of user input devices. The second controller 134 may encode the audio data using the encoder/decoder 144. The control data and encoded audio data (or unencoded data) that is to be transmitted to the first computing device 102 may be referred to as inbound data. The second controller 134 stores the inbound data in at least one buffer of inbound buffers 142. The second controller 134 provides the inbound data to the second radio 132 during a transmission window in which the second controller is in a slave transmit mode that is defined by the clock-synchronization message that was received from the second radio 132.

The second radio 132 receives the inbound data from the second controller 134 during a corresponding transmission window in which the second radio 132 is in a master receive mode. The second radio 132 stores the inbound data in at least one buffer of the inbound buffer 138 prior to transmission to the first computing device 102. The transmission of the inbound data is discussed in more detail below. Briefly, the second radio 132 of the second computing device 130 selects inbound data based on the priority of the inbound audio data and inbound control data and transmits the selected inbound data to the first computing device 102 during a subsequent transmission window when the second radio 132 is in a master transmit mode that is defined by the clock-synchronization message that it received from the first radio 108.

The first radio 108 of the first computing device 102 receives the transmitted inbound data from the second computing device 130 during the corresponding transmission window in which the first radio 108 is in a slave receive mode. The first radio 108 stores the inbound data in at least one buffer of inbound buffers 116. The first radio 108 then provides the inbound data to the first controller 106 during a subsequent transmission window in which the first radio 108 is in a slave transmit mode that is defined by the clock-synchronization message that it received from the first controller 106.

The first controller 106 receives the inbound data from the first radio 108 during the corresponding transmission window when the first controller 106 is in a master receive mode. The first controller 106 stores the inbound data in at least one buffer of inbound buffers 110. The first controller 106 can decode the encoded inbound audio data using the encoder/decoder 114. The first controller 106 may provide the inbound audio data or control data to the host 104. The host 104 can then utilize or send the audio data or control data as it is intended.

The first controller 106, the first radio 108, the second controller 134, and the second radio 132 may include one or more processors that are configured to execute computer instructions to, independently or collectively, employ embodiments described herein. The first controller 106, the first radio 108, the second controller 134, and the second radio 132 may include or utilize memory of one or more various types of non-volatile and/or volatile storage technologies. Examples of such memory may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. These memories may be used to buffer data or to store computer-readable instructions that are utilized by one or more processors perform actions, including embodiments described herein. Accordingly, the first computing device 102 and the second computing device may include one or more memories that are configured to stores computer instructions that are executable by one or more processors to perform embodiments described herein.

Figure 2A:
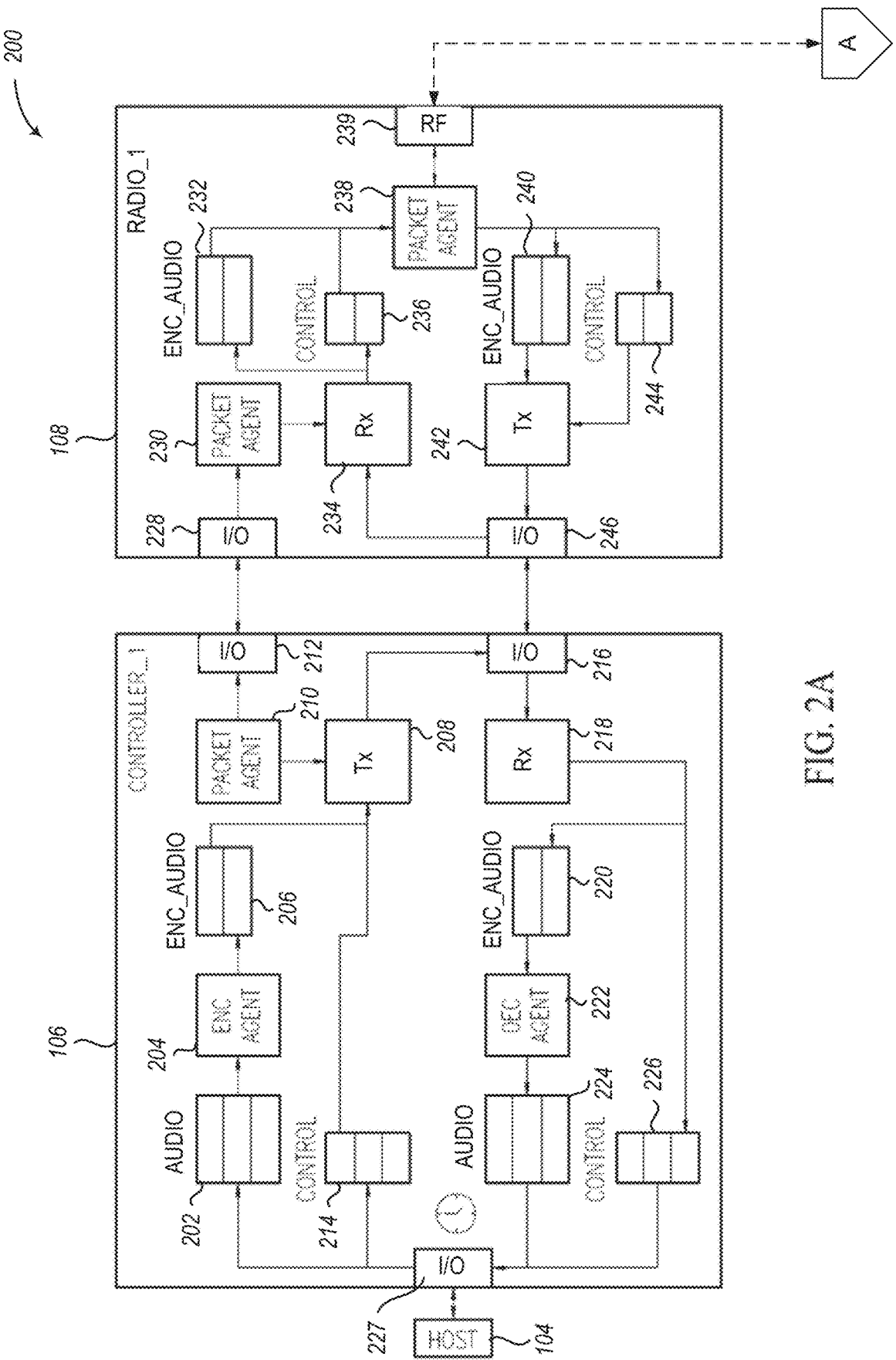
FIGS. 2A and 2B illustrate a block diagram showing an example conceptual structure of circuitry for utilizing a synchronized clock to transmit data in accordance with embodiments described herein.
Figure 2B:
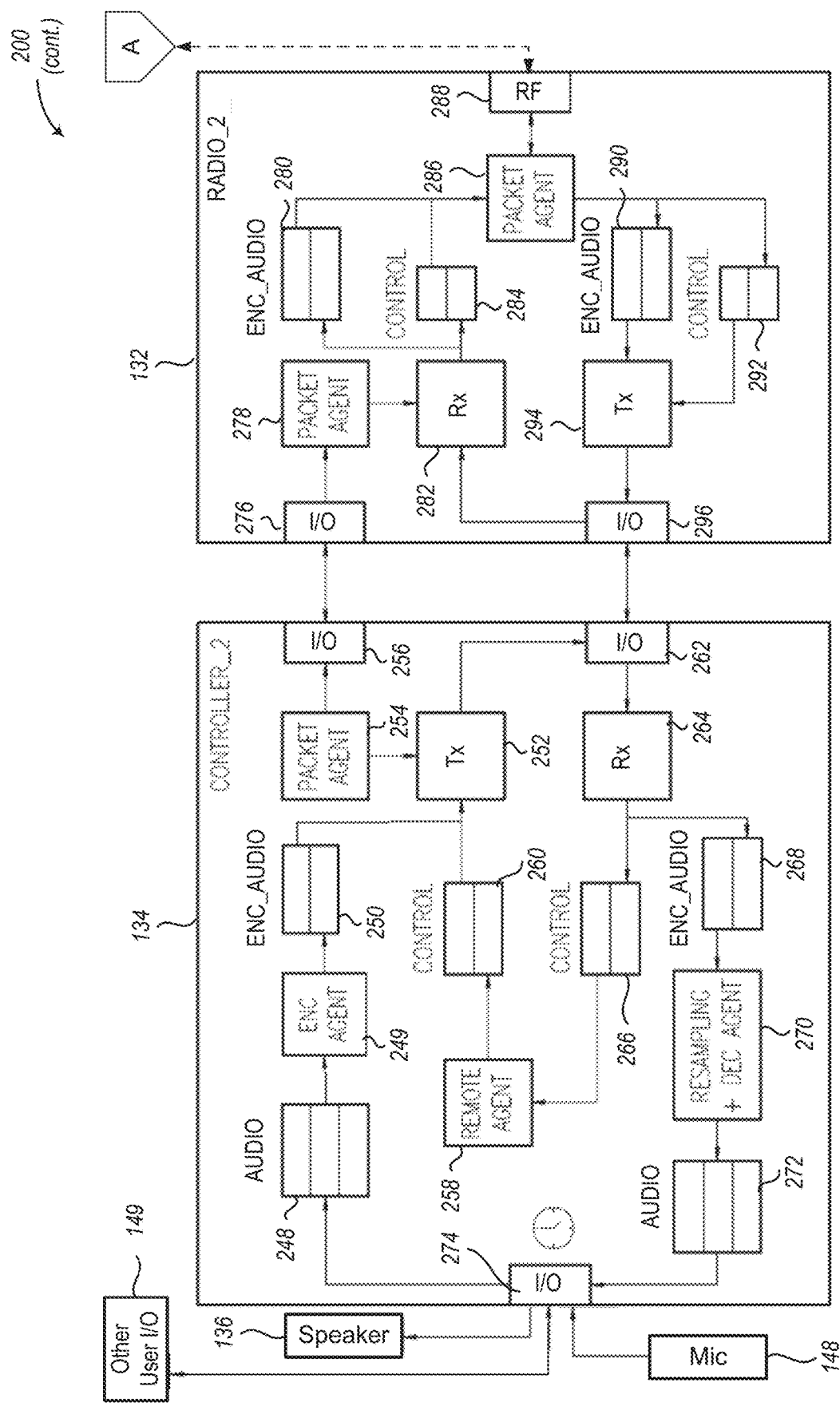

FIGS. 2A and 2B illustrate a block diagram showing an example 200 conceptual structure of circuitry for utilizing a synchronized clock to transmit data in accordance with embodiments described herein. Example 200 includes a first controller 106 and a first radio 108, illustrated in FIG. 2A, and a second controller 134 and a second radio 132, illustrated in FIG. 2B, which are similar to the corresponding controllers and radios described above in conjunction with FIG. 1. As indicated above, outbound data is audio data or control data, or both, that is to be transmitted from a first computing device that includes the first controller 106 and the first radio 108 to a second computing device that includes the second controller 134 and the second radio 132. Conversely, inbound data is audio data or control data, or both, that is to be transmitted from the second computing device that includes the second controller 134 and the second radio 132 to the first computing device that includes the first controller 106 and the first radio 108.

The first controller 106, on FIG. 2A, includes a first-controller first-outbound audio buffer 202, a first-controller encoding agent or module 204, a first-controller second-outbound audio buffer 206, a first-controller outbound-control buffer 214, a first-controller outbound transmit module 208, a first-controller packet agent or module 210, a first-controller first-input/output module 212, a first-controller second-input/output module 216, a first-controller inbound receive module 218, a first-controller first-inbound audio buffer 220, a first-controller decoding agent or module 222, a first-controller second-inbound audio buffer 224, a first-controller inbound-control buffer 226, and a first-controller third-input/output module 227. The first-controller first-outbound audio buffer 202, the first-controller second-outbound audio buffer 206, and the first-controller outbound-control buffer 214 may be included in or part of outbound buffers 112 in FIG. 1. And the first-controller first-inbound audio buffer 220, the first-controller second-inbound audio buffer 224, and the first-controller inbound-control buffer 226 may be included in or part of inbound buffers 110 in FIG. 1.

The first radio 108, on FIG. 2A, includes a first-radio first-input/output module 228, a first-radio first-packet agent or module 230, a first-radio outbound receive module 234, a first-radio outbound audio buffer 232, a first-radio outbound control buffer 236, a first-radio second-packet agent or module 238, a first-radio RF module 239, a first-radio inbound audio buffer 240, a first-radio inbound control buffer 244, a first-radio inbound transmit module 242, and a first-radio second-input/output module 246. The first-radio outbound audio buffer 232 first-radio outbound control buffer 236 may be included in or part of outbound buffers 118 in FIG. 1. And the first-radio inbound audio buffer 240 and the first-radio inbound control buffer 244 may be include in or part of inbound buffers 116 in FIG. 1. In some embodiments, the first-controller second-input/output module 216 and the first-radio second-input/output module 246 may utilize a serial peripheral interface to transmit data between the first controller 106 and the first radio 108.

The second controller 134, on FIG. 2B, includes a second-controller first-inbound audio buffer 248, a second-controller encoding agent or module 249, a second-controller second-inbound audio buffer 250, a second-controller remote agent or module 258, a second-controller inbound-control buffer 260, a second-controller inbound transmit module 252, a second-controller packet agent or module 254, a second-controller first-input/output module 256, a second-controller second-input/output module 262, a second-controller outbound receive module 264, a second-controller first-outbound audio buffer 268, a second-controller decoding agent or module 270, a second-controller second-outbound audio buffer 272, a second-controller outbound-control buffer 266, and a second-controller third-input/output module 274. The second-controller first-inbound audio buffer 248, the second-controller second-inbound audio buffer 250, and the second-controller inbound-control buffer 260 may be included in or part of inbound buffers 142 in FIG. 1. And the second-controller first-outbound audio buffer 268, the second-controller second-outbound audio buffer 272, and the second-controller outbound-control buffer 266 may be included in or part of outbound buffers 146 in FIG. 1.

The second radio 132, on FIG. 2B, includes a second-radio first-input/output module 276, a second-radio first-packet agent or module 278, a second-radio inbound receive module 282, a second-radio inbound audio buffer 280, a second-radio inbound control buffer 284, a second-radio second-packet agent or module 286, a second-radio RF module 288, a second-radio outbound audio buffer 290, a second-radio outbound control buffer 292, a second-radio outbound transmit module 294, and a second-radio second-input/output module 296. The second-radio inbound audio buffer 280 and the second-radio inbound control buffer 284 may be included in or part of inbound buffers 138 in FIG. 1. And the second-radio outbound audio buffer 290 and the second-radio outbound control buffer 292 may be included in or part of outbound buffers 140 in FIG. 1. In some embodiments, the second-controller second-input/output module 262 and the second-radio second-input/output module 296 may utilize a serial peripheral interface to transmit data between the second controller 134 and the second radio 132.

The following is a discussion of the transmission of outbound data from a first computing device (e.g., first computing device 102) to a second computing device (e.g., second computing device 130). Starting with FIG. 2A, the first-controller packet module 210 of the first controller 106 provides a clock-synchronization message to the first radio 108 via the first-controller first-input/output module 212. In some embodiments, other components or circuitry (not illustrated) of the first controller 106 may provide the clock-synchronization message to the first radio 108.

The first controller 106 receives outbound audio data or control data, or both, from host 104 via the first-controller input/output module 227. The first controller 106 stores outbound audio data in the first-controller first-outbound audio buffer 202 and stores outbound control data in the first-controller outbound-control buffer 214. In some embodiments, the outbound audio data is stereo audio data for multiple audio output channels. In other embodiments, the outbound audio data is mono-channel audio data. The outbound audio data is encoded via the first-controller encoding module 204 and the encoded outbound audio data is stored in the first-controller second-outbound audio buffer 206. The encoded outbound audio data and the outbound control data are provided from the first-controller second-outbound audio buffer 206 and first-controller outbound-control buffer 214, respectively, to the first-controller outbound transmit module 208.

The first-controller outbound transmit module 208 transmits outbound data from the first controller 106 to the first radio 108 via the first-controller second-input/output module 216 during a transmission window when the first controller 106 is in a master transmit mode defined by the clock-synchronization message. In some embodiments, the first-controller outbound transmit module 208 may provide priority to the transmission of outbound control data over the transmission of outbound audio data. The first-controller outbound transmit module 208 may coordinate the transmission of outbound data using the first-controller packet module 210. For example, the first-controller packet module 210 may provide packet information to the first radio 108 via the first-controller first-input/output module 212, which may indicate which data packets or data frames include outbound audio data and which packets or data frames include outbound control data.

The first-radio first-packet module 230 receives the clock-first-radio from the first controller 106 via the first-radio first-input/output module 228. The first radio second-packet module 238 can then provide the clock-synchronization message to the second radio 132 via the first-radio RF module 239. In some embodiments, other components or circuitry (not illustrated) of the first radio 108 may receive the clock-synchronization message from the first controller 106 or may provide the clock-synchronization message to the second radio 132.

The first radio 108 receives the outbound data at the first-radio outbound receive module 234 from the first controller 106 via the first-radio second-input/output module 246 during a transmission window in which the first radio 108 is in a slave receive mode. In various embodiments, the first-radio outbound receive module 234 coordinates the receipt of the outbound data with the first-radio first-packet module 230, which can receive packet information from the first controller 106 via the first-radio first-input/output module 228. The first-radio outbound receive module 234 stores the outbound audio data in the first-radio outbound audio buffer 232 and the outbound control data in the first-radio outbound control buffer 236.

The first-radio second-packet module 238 selects which outbound data from the first-radio outbound audio buffer 232 and the first-radio outbound control buffer 236 to transmit to the second radio 132 of the second computing device. In various embodiments, the outbound audio data is given a higher priority than the outbound audio data. The first-radio second-packet module 238 selects which outbound data to transmit to the second radio 132 based on their priorities. The selected data may be all high-priority control data or it may be a pre-selected percentage or ratio of high-priority control data to low-priority audio data. For example, if the first-radio second-packet module 238 can send five data packets, then the first-radio second-packet module 238 may select high-priority control data from the first-radio outbound control buffer 236 to fill four data packets and low-priority audio data from the first-radio outbound audio buffer 232 to fill one data packet. In some embodiments, the amount of data stored in the first-radio outbound audio buffer 232 and the first-radio outbound control buffer 236 may be used to determine the amount of data to select from each buffer—such that data from the fuller buffer is selected first or more data is selected from the fuller buffer compared to the emptier buffer—but selection of the high-priority control data is preferred. Accordingly, a status, such as fullness, delay, or wait times, of the first-radio outbound audio buffer 232 and the first-radio outbound control buffer 236 may also be used to select the outbound audio data and the outbound control data.

The first-radio second-packet module 238 transmits the selected data to the second radio 132 of the second computing device via the first-radio RF module 239 during a transmission window in which the first radio 108 is in the slave transmit mode. The first-radio second-packet module 238 may attempt to resend the same selected outbound data to the second radio 132 of the second computing device during a same transmission window or it may wait until a next transmission window in which the first radio 108 is in the slave transmit mode.

Turning to FIG. 2B, the second-radio second-packet module 286 of the second radio 132 receives the clock-synchronization message from the first radio 108 via the second-radio RF module 288. The second radio 132 can utilize the second-radio first-packet module 278 to forward the clock-synchronization message to the second controller 134 via the second-radio first-input/output module 276. In some embodiments, other components or circuitry (not illustrated) of the second radio 132 may receive the clock-synchronization message from the first radio 108 or may provide the clock-synchronization message to the second controller 134.

During a transmission window in which the second radio 132 is in the master receive mode, the second-radio second-packet module 286 receives the transmitted outbound data from the first radio 108 via the second-radio RF module 288. The second-radio second-packet module 286 stores the received outbound audio data in the second-radio outbound audio buffer 290 and the received outbound control data in the second-radio outbound control buffer 292. In some embodiments, the received outbound data may be stored in a combined audio/control buffer (not illustrated).

The second-radio outbound transmit module 294 obtains the outbound data from the second-radio outbound audio buffer 290 and the second-radio outbound control buffer 292 and transmits the outbound data to the second controller 134 via the second-radio second-input/output module 296 during a subsequent transmission window in which the second radio 132 is in the master transmit mode. In some embodiments, the second-radio outbound transmit module 294 may provide priority to the transmission of outbound control data over the transmission of outbound audio data.

The second-controller packet agent or module 254 of the second controller 134 receives the clock-synchronization message from the second radio 132 via the second-controller first-input/output module 256. In some embodiments, other components or circuitry (not illustrated) of the second controller 134 may receive the clock-synchronization message from the second radio 132. The second-controller outbound receive module 264 of the second controller 134 receives the outbound data from the second radio 132 via the second-controller second-input/output module 262 during a transmission window in which the second controller is in the slave receive mode. The second-controller outbound receive module 264 stores the outbound audio data in the second-controller first-outbound audio buffer 268 and stores the outbound control data in the second-controller outbound-control buffer 266. The second-controller remote module 258 obtains the outbound control data from the second-controller outbound-control buffer 266. As discussed herein, the second-controller remote module 258 can output or utilize the received outbound control data to control functionality or controls of the second computing device, such as haptic interfaces, control interfaces, or other user feedback interfaces. The second controller 134 can decode the received outbound audio data stored in the second-controller first-outbound audio buffer 268 using the second-controller decoding module 270. In some embodiments, the second-controller decoding module 270 may also perform resampling mechanisms on the audio data, if needed. The decoded outbound audio data is stored in the second-controller second-outbound audio buffer 272. The second controller can then output the outbound audio data to a speaker 136 via the second-controller third-input/output module 274 for output to a user.

The following is a discussion of the transmission of inbound data from a second computing device (e.g., second computing device 130) to a first computing device (e.g., first computing device 102). Starting with FIG. 2B, the second controller 134 receives inbound audio data from the microphone 148 via the second-controller third-input/output module 274, inbound control data via the second-controller remote module 258, or both. In various embodiments, the second-controller remote module 258 may obtain the inbound control data via one or more user input buttons, joysticks, touch screens, or other user input interfaces. In some other embodiments, other computing devices may also provide some or all of the inbound control data.

The second controller 134 stores inbound audio data in the second-controller first-inbound audio buffer 248 and stores inbound control data in the second-controller inbound-control buffer 260. In some embodiments, the inbound audio data is stereo audio data for multiple audio channels. In other embodiments, the inbound audio data is mono-channel audio data. The inbound audio data is encoded via the second-controller encoding agent or module 249 and the encoded inbound audio data is stored in the second-controller second-inbound audio buffer 250. The encoded inbound audio data and the inbound control data are provided from the second-controller second-inbound audio buffer 250 and the second-controller inbound-control buffer 260, respectively, to the second-controller inbound transmit module 252.

The second-controller inbound transmit module 252 transmits inbound data from the second controller 134 to the second radio 132 via the second-controller second-input/output module 262 during a transmission window when the second controller 134 is in the slave transmit mode. In some embodiments, the second-controller inbound transmit module 252 may provide priority to the transmission of inbound control data over the transmission of inbound audio data. The second-controller inbound transmit module 252 may coordinate the transmission of inbound data using the second-controller packet module 254. For example, the second-controller packet module 254 may provide packet information to the second radio 132 via the second-controller first-input/output module 256, which may indicate which data packets include inbound audio data and which packets include inbound control data.

The second radio 132 receives the inbound data at the second-radio inbound receive module 282 from the second controller 134 via the second-radio second-input/output module 296 during a corresponding transmission window in which the second radio 132 is in the master receive mode. In various embodiments, the second-radio inbound receive module 282 coordinates the receipt of the inbound data with the second-radio first-packet module 278, which can receive packet information from the second controller 134 via the second-radio first-input/output module 276. The second-radio inbound receive module 282 stores the inbound audio data in the second-radio inbound audio buffer 280 and the inbound control data in the second-radio inbound control buffer 284.

The second-radio second-packet module 286 selects which inbound data from the second-radio inbound audio buffer 280 and the second-radio inbound control buffer 284 to transmit to the first radio 108 of the first computing device. Similar to the outbound data discussed above, the inbound control data is given a higher priority than the inbound audio data. The second-radio second-packet module 286 selects which inbound data to transmit to the first radio 108 based on these priorities. The second-radio second-packet module 286 transmits the selected inbound data to the first computing device during a transmission window in which the second radio 132 is in a master transmit mode.

In some embodiments, the second-radio second-packet module 286 may be configured to transmit a pre-selected maximum amount of data during each transmission window, as described herein. The selected inbound data may be all high-priority control data or it may be a pre-selected percentage or ratio of high-priority control data to low-priority audio data. For example, if the second-radio second-packet module 286 can send four data packets, then the second-radio second-packet module 286 may select high-priority control data from the second-radio inbound control buffer 284 to fill three data packets and low-priority audio data from the second-radio inbound audio buffer 280 to fill one data packet. In some embodiments, the amount of data stored in the second-radio inbound audio buffer 280 and the second-radio inbound control buffer 284 may be used to determine the amount of data to select from each buffer—such that data from the fuller buffer is selected first or more data is selected from the fuller buffer compared to the emptier buffer—but selection of the high-priority control data is preferred. Accordingly, a status, such as fullness, delay, or wait times, of the second-radio inbound audio buffer 280 and the second-radio inbound control buffer 284 may also be used to select the inbound audio data and the inbound control data.

Turning back to FIG. 2A, the first-radio second-packet module 238 of the first radio 108 receives the transmitted inbound data from the second radio 132 via the first-radio RF module 239 during a corresponding transmission window when the first radio 108 is in a slave receive mode. The first-radio second-packet module 238 stores the received inbound audio data in the first-radio inbound audio buffer 230 and the received inbound control data in the first-radio inbound control buffer 244. In some embodiments, the received inbound data may be stored in a combined audio/control buffer (not illustrated). The first-radio inbound transmit module 242 obtains the inbound data from the first-radio inbound audio buffer 240 and the first-radio inbound control buffer 244 and transmits the inbound data to the first controller 106 via the first-radio second-input/output module 246 during a transmission window when the first radio 108 is in a slave transmit mode. In some embodiments, the first-radio inbound transmit module 242 may provide priority to the transmission of inbound control data over the transmission of inbound audio data.

The first-controller inbound receive module 218 of the first controller 106 receives the inbound data from the first radio 108 via the first-controller second-input/output module 216 during a corresponding transmission window when the first controller 106 is in the master receive mode. The first-controller inbound receive module 218 stores the inbound audio data in the first-controller first-inbound audio buffer 220 and stores the inbound control data in the first-controller inbound-control buffer 226. The first controller 106 can decode the received inbound audio data stored in the first-controller first-inbound audio buffer 220 using the first-controller decoding module 222. The decoded inbound audio data is stored in the first-controller second-inbound audio buffer 224. The first controller 106 can transmit or provide the inbound data from the first-controller second-inbound audio buffer 224 and the first-controller inbound-control buffer 226 to the host 104 via the first-controller third-input/output module 227.

In some embodiments, the first controller 106 may send clock-synchronization messages periodically, at predefined intervals, in response to a request from another component, or in response to a loss of communication between any of the components. In various embodiments, the first radio 108, the second radio 132, or the second controller 134 can use information from one or more clock-synchronization messages employ at least one clock-skew-compensation mechanism. For example, the second controller 134 can compare the time passed between receipt of two synchronization messages with an internal clock of the second controller 134. If the time passed is greater than or less than the predefined interval between synchronization messages, then the second controller 134 can determine that clock skew has occurred. In response, the second controller 134 for take actions to remedy the clock skew or provide a message to the other components indicating that there is an issue with the transmission windows.

Figure 3:
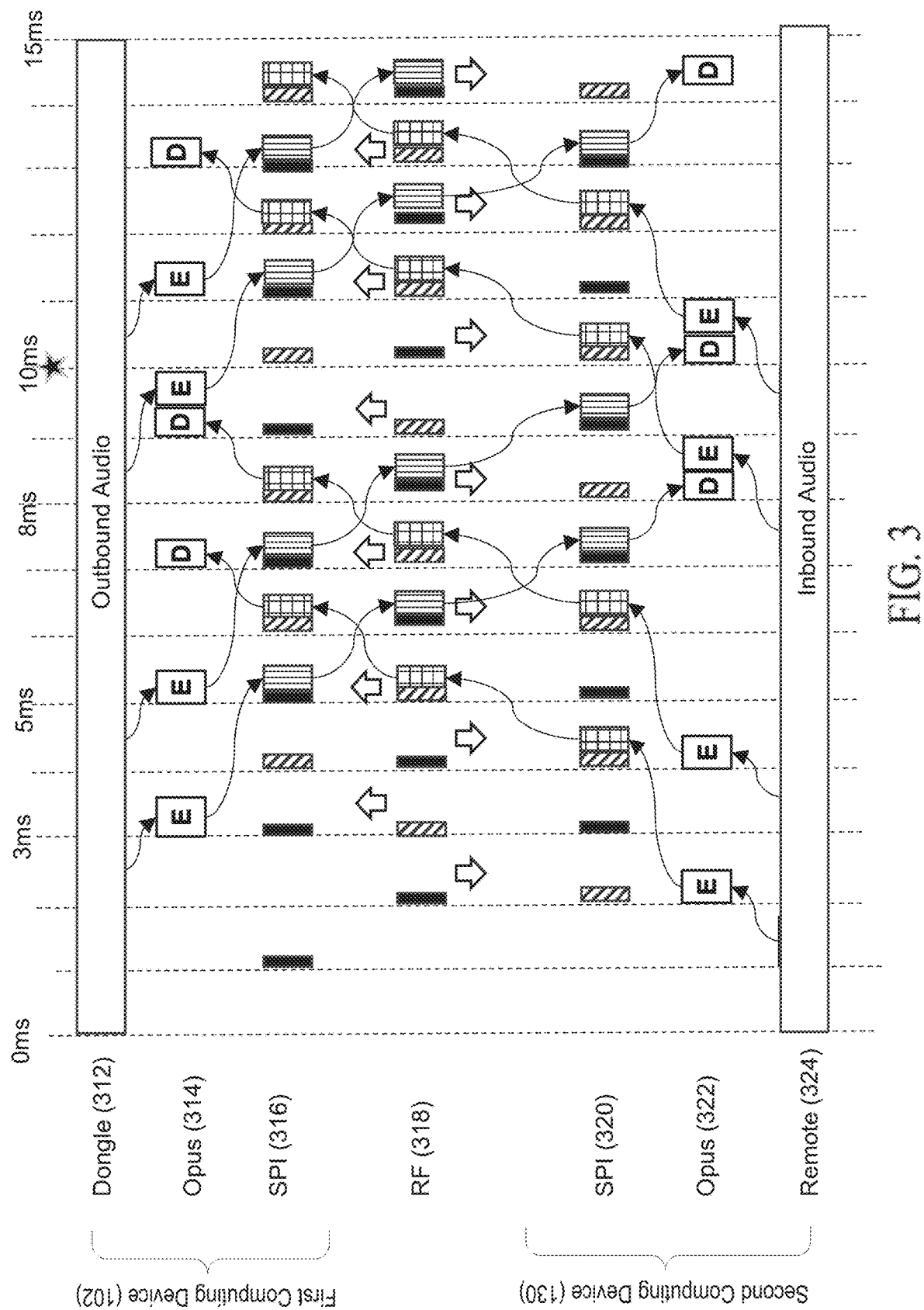
FIGS. 3 and 4 show example transmission sequences between two computing devices in accordance with embodiments described herein.
Figure 4:
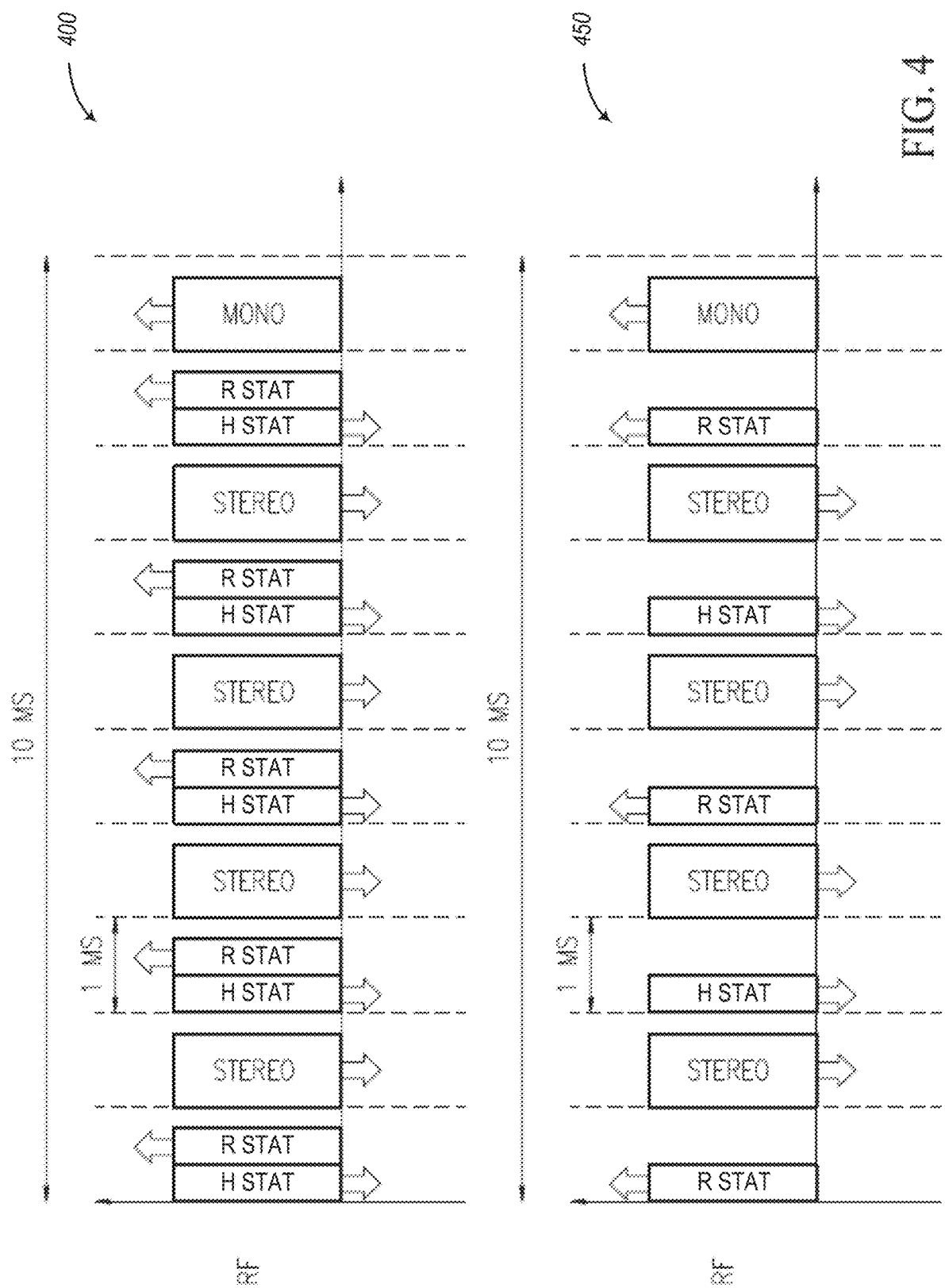
Figure 5:
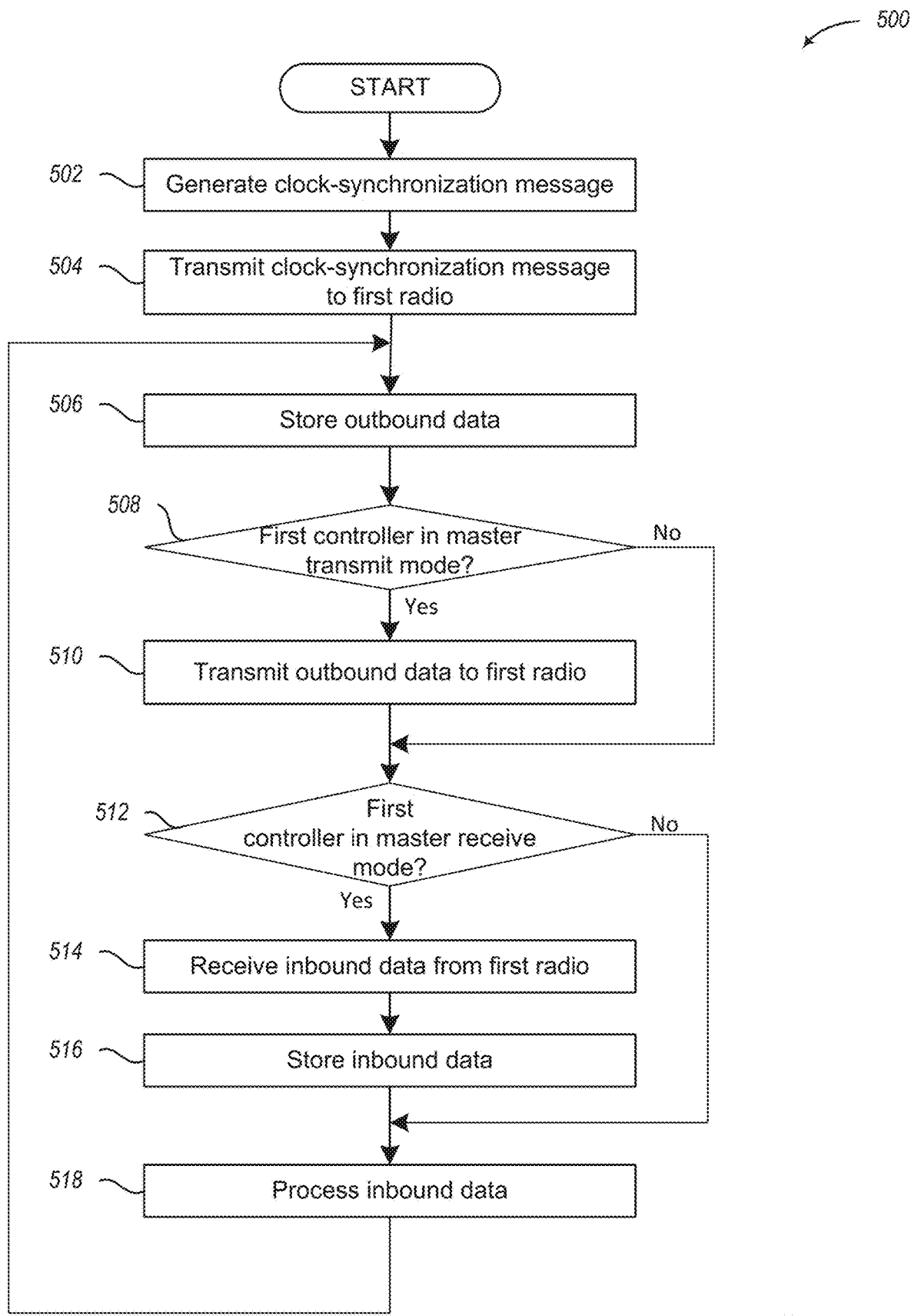
FIG. 5 shows a logical flow diagram of a process by a first controller of a first computing device for utilizing a fixed transmission windows to send and receive data in accordance with embodiments described herein.

FIGS. 3-5 show example transmission sequences between two computing devices in accordance with embodiments described herein.

FIG. 3 illustrates an example sequence between a first computing device 102 and a second computing device 130, as described herein. In this example, dongle 312 obtains outbound audio data. OPUS 314 represents the encoding of outbound audio data and the decoding of inbound audio data as performed by the first-controller encoding module 204 and the first-controller decoding module 222, respectively. SPI 316 represents the transmission of data between the first controller 106 and the first radio 108 via the first-controller second-input/output module 216 and the first-radio second-input/output module 246, respectively. Remote 324 obtains inbound audio data. OPUS 322 represents the encoding of inbound audio data and the decoding of outbound audio data as performed by the second-controller encoding module 249 and the second-controller decoding module 270, respectively. SPI 320 represents the transmission of data between the second controller 134 and the second radio 132 via the second-controller second-input/output module 262 and the second-radio second-input/output module 296, respectively.

RF 318 represents the transmission of data between the first radio 108 of the first computing device 102 and the second radio 132 of the second computing device 130 via the first-radio RF module 239 and the second-radio RF module 288, respectively. Moreover, each 1 ms time interval may be a transmission window, as defined by a clock-synchronization message. For ease of discussion, each transmission window will be referred to as the following, window_1 from 0 ms to 1 ms, window_2 from 1 ms to 2 ms, window_3 from 2 ms to 3 ms, window_4 from 3 ms to 4 ms, window_5 from 4 ms to 5 ms, window_6 from 5 ms to 6 ms, window_7 from 6 ms to 7 ms, window_8 from 7 ms to 8 ms, window_9 from 8 ms to 9 ms, window_10 from 9 ms to 10 ms, window_11 from 10 ms to 11 ms, window_12 from 11 ms to 12 ms, window_13 from 12 ms to 13 ms, window_14 from 13 ms to 14 ms, window_15 from 14 ms to 15 ms.

Dongle 312 obtains outbound audio data and remote 324 obtains inbound audio data throughout each transmission window. Thus, during window_1, dongle 312 obtains outbound audio data and remote 324 obtains inbound audio data.

During window_2, the first controller 106 is in a master transmit mode and the first radio 108 is in a slave receive mode. The first controller 106 transmits outbound control data to the first radio 108 via SPI 316.

During window_3, the first radio 108 is in a slave transmit mode, the second radio 132 is in a master receive mode, and the second controller 134 is in a slave transmit mode. The first radio 108 transmits outbound control data that was received by the first radio 108 during window_2 to the second radio 132 via RF 318. And the second controller 134 transmits inbound control data to the second radio 132 via SPI 320. Opus 322 begins encoding the inbound audio data.

During window_4, the first controller 106 and the second radio 132 are in a master transmit mode, and the first radio 108 and the second controller 134 are in a slave receive mode. The first controller 106 transmits outbound control data to the first radio 108 via SPI 316. The second radio 132 transmits inbound control data that was received by the second radio 132 during window_3 to the first radio 108 via RF 318. The second radio 132 transmits outbound control data that was received by the second radio 132 during window_3 to the second controller 134 via SPI 320. Opus 314 begins encoding the outbound audio.

During window_5, the first controller 106 and the second radio 132 are in a master receive mode, and the first radio 108 and the second controller 134 are in a slave transmit mode. The first radio 108 transmits inbound control data that was received by the first radio 108 during window_4 to the first controller 106 via SPI 316. The first radio 108 transmits outbound control data that was received by the first radio 108 during window_4 to the second radio 132 via RF 318. And the second controller 134 transmits inbound control data and encoded inbound audio data to the second radio 132 via SPI 320. Opus 322 continues to encode the inbound audio data.

During window_6, the first controller 106 and the second radio 132 are in a master transmit mode, and the first radio 108 and the second controller 134 are in a slave receive mode. The first controller 106 transmits outbound control data and encoded outbound audio data to the first radio 108 via SPI 316. The second radio 132 transmits inbound control data and encoded inbound audio data that was received by the second radio 132 during window_5 to the first radio 108 via RF 318. The second radio 132 transmits outbound control data that was received by the second radio 132 during window_5 to the second controller 134 via SPI 320. Opus 314 continues encoding the outbound audio.

During window_7, the first controller 106 and the second radio 132 are in a master receive mode, and the first radio 108 and the second controller 134 are in a slave transmit mode. The first radio 108 transmits inbound control data and encoded inbound audio data that was received by the first radio 108 during window_6 to the first controller 106 via SPI 316. The first radio 108 transmits outbound control data and encoded outbound audio data that was received by the first radio 108 during window_6 to the second radio 132 via RF 318. And the second controller 134 transmits inbound control data and encoded inbound audio data to the second radio 132 via SPI 320.

During window_8, the first controller 106 and the second radio 132 are in a master transmit mode, and the first radio 108 and the second controller 134 are in a slave receive mode. The first controller 106 transmits outbound control data and encoded outbound audio data to the first radio 108 via SPI 316. The second radio 132 transmits inbound control data and encoded inbound audio data that was received by the second radio 132 during window_7 to the first radio 108 via RF 318. The second radio 132 transmits outbound control data and encoded outbound audio data that was received by the second radio 132 during window_7 to the second controller 134 via SPI 320. Opus 314 decodes the encoded inbound audio data received by the first controller 106 during window_7.

During window_9, the first controller 106 and the second radio 132 are in a master receive mode, and the first radio 108 and the second controller 134 are in a slave transmit mode. The first radio 108 transmits inbound control data and encoded inbound audio data that was received by the first radio 108 during window_8 to the first controller 106 via SPI 316. The first radio 108 transmits outbound control data and encoded outbound audio data that was received by the first radio 108 during window_8 to the second radio 132 via RF 318. And the second controller 134 transmits inbound control data to the second radio 132 via SPI 320. Opus 322 decodes the encoded outbound audio data received by the second controller 134 during window_8 and continues to encode additional inbound audio data.

During window_10, the first controller 106 and the second radio 132 are in a master transmit mode, and the first radio 108 and the second controller 134 are in a slave receive mode. The first controller 106 transmits outbound control data to the first radio 108 via SPI 316. The second radio 132 transmits inbound control data that was received by the second radio 132 during window_9 to the first radio 108 via RF 318. The second radio 132 transmits outbound control data and encoded outbound audio data that was received by the second radio 132 during window_9 to the second controller 134 via SPI 320. Opus 314 decodes the encoded inbound audio data received by the first controller 106 during window_9 and continues to encode additional outbound audio data.

During window_11, the first controller 106 and the second radio 132 are in a master receive mode, and the first radio 108 and the second controller 134 are in a slave transmit mode. The first radio 108 transmits inbound control data that was received by the first radio 108 during window_10 to the first controller 106 via SPI 316. The first radio 108 transmits outbound control data that was received by the first radio 108 during window_10 to the second radio 132 via RF 318. And the second controller 134 transmits inbound control data and encoded inbound audio data to the second radio 132 via SPI 320. Opus 322 decodes the encoded outbound audio data received by the second controller 134 during window_10 and continues to encode additional inbound audio data.

During window_12, the first controller 106 and the second radio 132 are in a master transmit mode, and the first radio 108 and the second controller 134 are in a slave receive mode. The first controller 106 transmits outbound control data and encoded outbound audio data to the first radio 108 via SPI 316. The second radio 132 transmits inbound control data and encoded inbound audio data that was received by the second radio 132 during window_11 to the first radio 108 via RF 318. The second radio 132 transmits outbound control data that was received by the second radio 132 during window_11 to the second controller 134 via SPI 320. Opus 314 continues encoding the outbound audio.

During window_13, the first controller 106 and the second radio 132 are in a master receive mode, and the first radio 108 and the second controller 134 are in a slave transmit mode. The first radio 108 transmits inbound control data and encoded inbound audio data that was received by the first radio 108 during window_12 to the first controller 106 via SPI 316. The first radio 108 transmits outbound control data and encoded outbound audio data that was received by the first radio 108 during window_12 to the second radio 132 via RF 318. And the second controller 134 transmits inbound control data and encoded inbound audio data to the second radio 132 via SPI 320.

During window_14, the first controller 106 and the second radio 132 are in a master transmit mode, and the first radio 108 and the second controller 134 are in a slave receive mode. The first controller 106 transmits outbound control data and encoded outbound audio data to the first radio 108 via SPI 316. The second radio 132 transmits inbound control data and encoded inbound audio data that was received by the second radio 132 during window_13 to the first radio 108 via RF 318. The second radio 132 transmits outbound control data and encoded outbound audio data that was received by the second radio 132 during window_13 to the second controller 134 via SPI 320. Opus 314 decodes the encoded inbound audio data received by the first controller 106 during window_13.

During window_15, the first controller 106 and the second radio 132 are in a master receive mode, and the first radio 108 and the second controller 134 are in a slave transmit mode. The first radio 108 transmits inbound control data and encoded inbound audio data that was received by the first radio 108 during window_14 to the first controller 106 via SPI 316. The first radio 108 transmits outbound control data and encoded outbound audio data that was received by the first radio 108 during window_14 to the second radio 132 via RF 318. And the second controller 134 transmits inbound control data to the second radio 132 via SPI 320. Opus 322 decodes the encoded outbound audio data received by the second controller 134 during window_14.

The specific size and positions within the transmission windows of the illustrative data transmissions is for illustrative purposes and should not be limiting. For example, encryption of the audio data may occur across multiple transmission windows, even though FIG. 3 shows each encryption as being contained within a transmission window.

In various embodiments, the first controller 106 may send another or an updated clock-synchronization message to the first radio 108, which in turn sends the updated clock-synchronization message to the second radio 132, which in turn sends the updated clock-synchronization message to the second controller 134. In this example, the updated clock-synchronization message is sent by the first controller 106 after window_10, as illustrated by the star. In various embodiments, clock-synchronization message may be sent for each transmission window, such as every 1 ms.

FIG. 4 illustrates example sequences 400 and 450 for the RF transmissions between a first computing device 102 (e.g., the first radio 108) and a second computing device 130 (e.g., the second radio 132). Although embodiments described above describe an alternating master transmit mode/slave receive mode with master receive mode/slave transmit mode, embodiments are not so limited. For example, in some embodiments, the first computing device 102 and the second computing device 130 may both transmit control data to one another during a single transmission window.

In example 400, during a first transmission window, the first computing device 102 transmits outbound control data (referred to as "H STAT") to the second computing device 130 followed by the second computing device 130 transmitting inbound control data (referred to as "R STAT") to the first computing device 102. In this illustrated example 400, the first computing device 102 and the second computing device 130 both transmit data to one another during every other transmission window.

In some embodiments, the computing devices may also coordinate their status with each other to determine which computing device is to transmit audio data during a next transmission window. For example, the first computing device 102 can provide an indication of how full its outbound audio buffers are to the second computing device 130, and the second computing device 130 can provide an indication of how full its inbound audio buffers are to the first computing device 102. The computing devices can use this information to determine which computing device is put into a transmit mode during a next transmission window. As illustrated, the first computing device 102 is put into transmit mode during the second transmission window.

In example 400, the first computing device 102 and the second computing device 130 both transmit data to one another during every other transmission window. During the first, third, fifth and seventh transmission windows, the computing devices determine that the first computing device 102 is to transmit outbound audio data to the second computing device 130 during the second, fourth, sixth, and eighth transmission windows. During the ninth transmission window, however, the computing devices determinate that the second computing device 130 is to transmit inbound audio data to the first computing device 102 during the tenth transmission window.

Example 450 is similar to example 400, but instead of the first computing device 102 and the second computing device 130 transmitting control data to each other during a same transmission window, they take turns during every other transmission window. As shown in example 450, the second computing device 130 transmits inbound control data to the first computing device 102 during the first, fifth, and ninth transmission windows and the first computing device 102 transmits outbound control data to the second computing device 130 during the third and seventh transmission windows. Similar to example 400, the first computing device 102 and the second computing device 130 in example 450 determine which computing device is to transmit audio data in between the control data transmission windows. In example 450, the first computing device 102 is to transmit outbound audio data to the second computing device 130 during the second, fourth, sixth, and eighth transmission windows and the second computing device 130 is to transmit inbound audio data to the first computing device 102 during the tenth transmission window.

Examples 400 and 450 illustrate an alternative transmission sequence within defined transmission windows. As discussed elsewhere herein, a clock-synchronization message may be used to define the transmission windows.

The operation of one or more embodiments will now be described with respect to FIGS. 5-8, and for convenience will be described with respect to the embodiments of the figures described above.

FIG. 5 shows a logical flow diagram of a process 500 by a first controller of a first computing device for utilizing a fixed transmission windows to send and receive data in accordance with embodiments described herein. In various embodiments, process 500 may be implemented by or executed on one or more computing devices or circuitry, such as first controller 106 of the first computing device 102 in FIG. 1.

Process 500 begins, after a start block, at block 502, where a clock-synchronization message is generated by the first controller 106. In some embodiments, the clock-synchronization message may identify a transmission window length and identify which computing components are in transmit mode and which are in receive mode during a first and subsequent transmission windows. As discussed herein, the clock-synchronization message identifies alternating master transmit mode/slave receive mode with master receive mode/slave transmit mode.

In various embodiments, the clock-synchronization message may be adjusted or modified based on feedback from the second controller 134, the second radio 132, or the first radio 108. For example, the second controller 134 may continuously have an amount of inbound data that exceeds a maximum threshold. In this situation, the second controller 134 may notify the first controller 106 (e.g., by transmitting messages through the second radio 132 and the first radio 108) to increase the transmission window length. The first controller 106 can generate a clock-synchronization message to define a larger transmission window length to allow additional data to be transmitted during each transmission window.

Process 500 proceeds to block 504, where the clock-synchronization message is transmitted to the first radio 108.

Process 500 continues at block 506, where outbound audio data or control data or both is stored. In some situations, block 506 may be optional and may not be performed as there may be no outbound audio data or outbound control data to store. Moreover, in some embodiments, the storage of outbound data may be a background process and performed independent from process 500. As described herein, the outbound audio data and the outbound control data are stored in separate buffers such that the transmission of control data can be prioritized over the transmission of audio data.

Process 500 proceeds next to decision block 508, where a determination is made whether the first controller 106 is in a master transmit mode as defined by the clock-synchronization message. If the first controller 106 is in a master transmit mode, then process 500 flows to block 510; otherwise, process 500 flows to decision block 512.

At block 510, the stored outbound data is transmitted to the first radio 108.

After block 510 or if the first controller 106 is not in the master receive mode, then process 500 proceeds to decision block 512. At decision block 512, a determination is made whether the first controller 106 is in a master receive mode as defined by the clock-synchronization message. If the first controller 106 is in a master receive mode, then process 500 flows to block 514; otherwise, process 500 flows to block 518.

In some embodiments, the first controller 106 may be in neither the master transmit mode or the master receive mode if the first computing device 102 loses communication with the second computing device 130. In other embodiments, the first controller 106 may be in neither the master transmit mode or the master receive mode if the first controller 106 needs to reset the clock synchronization due to some unforeseen imbalance, un-synchronization, or lack of transmission window continuity between the various components.

At block 514, the first controller 106 receives inbound data from the first radio 108.

Process 500 proceeds to block 516, where the first controller 106 stores the inbound data. As discussed herein, the inbound audio data may be stored in buffers separate from the inbound control data.

Process 500 continues at block 518, where the inbound data is processes. In some embodiments, the inbound data may be provided to another computing device, such as host 104 or another computing device that is remote from the first computing device.

After block 518, process 500 loops to block 506 to continue to store outbound data. As mentioned above, the storage of outbound data may be performed in parallel to process 500. Although not illustrated, in some embodiments, process 500 may loop to block 502 to regenerate and retransmit the clock-synchronization message.

Figure 6:
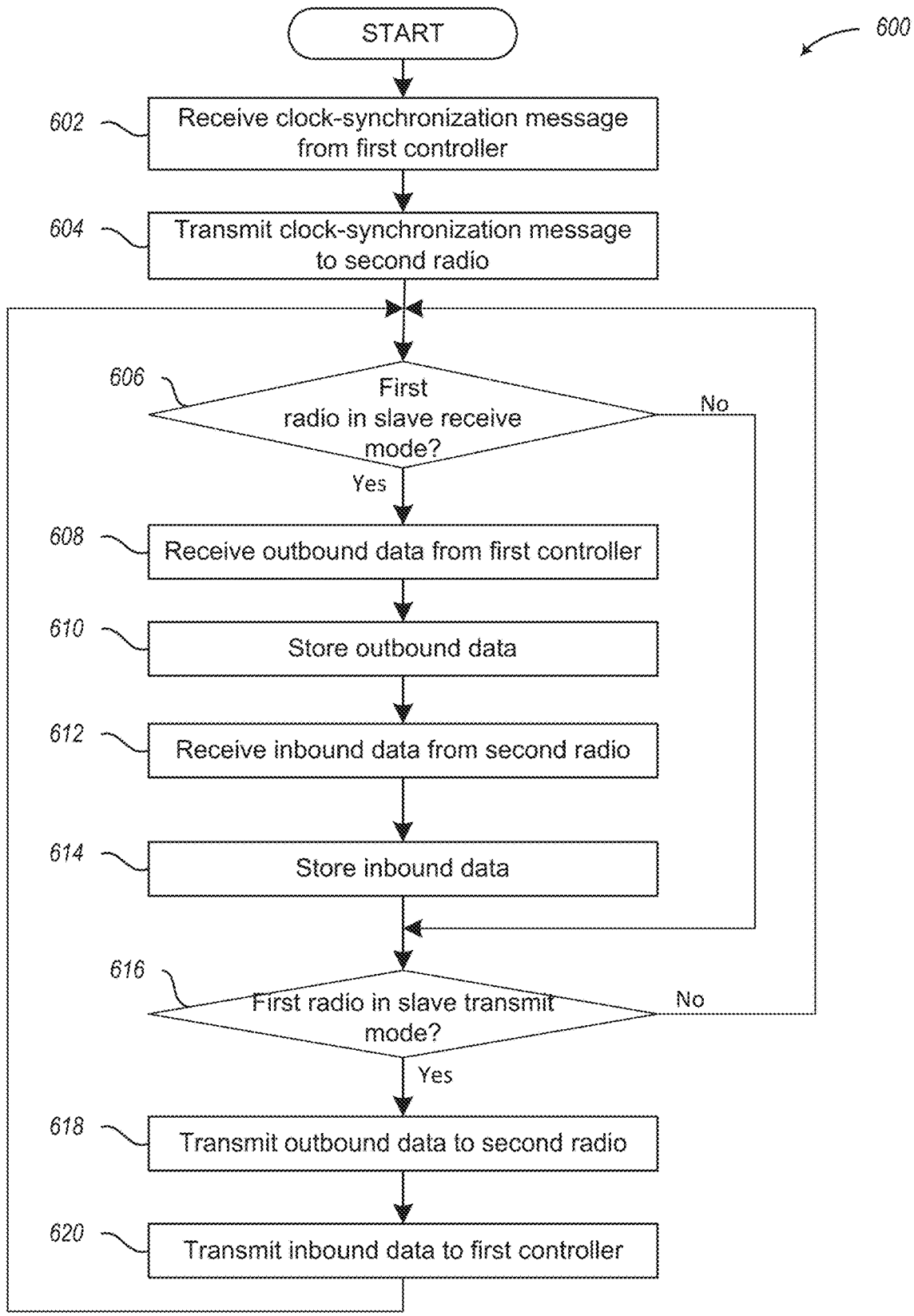
FIG. 6 shows a logical flow diagram of a process by a first radio of the first computing device for utilizing the fixed transmission windows to send and receive data in accordance with embodiments described herein.

FIG. 6 shows a logical flow diagram of a process 600 by a first radio of the first computing device for utilizing the fixed transmission windows to send and receive data in accordance with embodiments described herein. In various embodiments, process 600 may be implemented by or executed on one or more computing devices or circuitry, such as first radio 108 of the first computing device 102 in FIG. 1.

Process 600 begins, after a start block, at block 602, where a clock-synchronization message is received from the first controller 106.

Process 600 proceeds to block 604, where the clock-synchronization message is transmitted to the second radio 132.

Process 600 continues at decision block 606, where a determination is made whether the first radio 108 is in a slave receive mode as defined by the clock-synchronization message. If the first radio 108 is in a slave receive mode, then process 600 flows to block 608; otherwise, process 600 flows to decision block 616.

At block 608, the outbound data is received from the first controller 106.

Process 600 proceeds to block 610, where the outbound data is stored. As described herein, the outbound audio data is stored separate from the outbound control data so that transmission of the outbound control data is prioritized over the transmission of the outbound audio data.

Process 600 continues at block 612, where inbound data is received from the second radio 132.

Process 600 proceeds next to block 614, where the inbound data is stored. As described herein, the inbound audio data is stored separate from the inbound control data so that transmission of the inbound control data is prioritized over the transmission of the inbound audio data.

After block 614, or if the first radio 108 is not in a slave receive mode at decision block 606, then process continues at decision block 616. At decision block 616, a determination is made whether the first radio 108 is in a slave transmit mode as defined by the clock-synchronization message. If the first radio 108 is in a slave transmit mode, then process 600 flows to block 618; otherwise, process 600 loops to block 606. In some embodiments, the first radio 108 may be in neither the slave transmit mode or the slave receive mode if the first computing device 102 loses communication with the second computing device 130. In other embodiments, the first radio 108 may be notified that the transmission windows have become out of synchronization and need to be reset. At which point, the first radio 108 may need to wait for an updated clock-synchronization message.

At block 618, the stored outbound data is transmitted to the second radio 132.

Process 600 proceeds next to block 620, where the stored inbound data is transmitted to the first controller 106. After block 620, process 600 loops to block 606.

Figure 7:
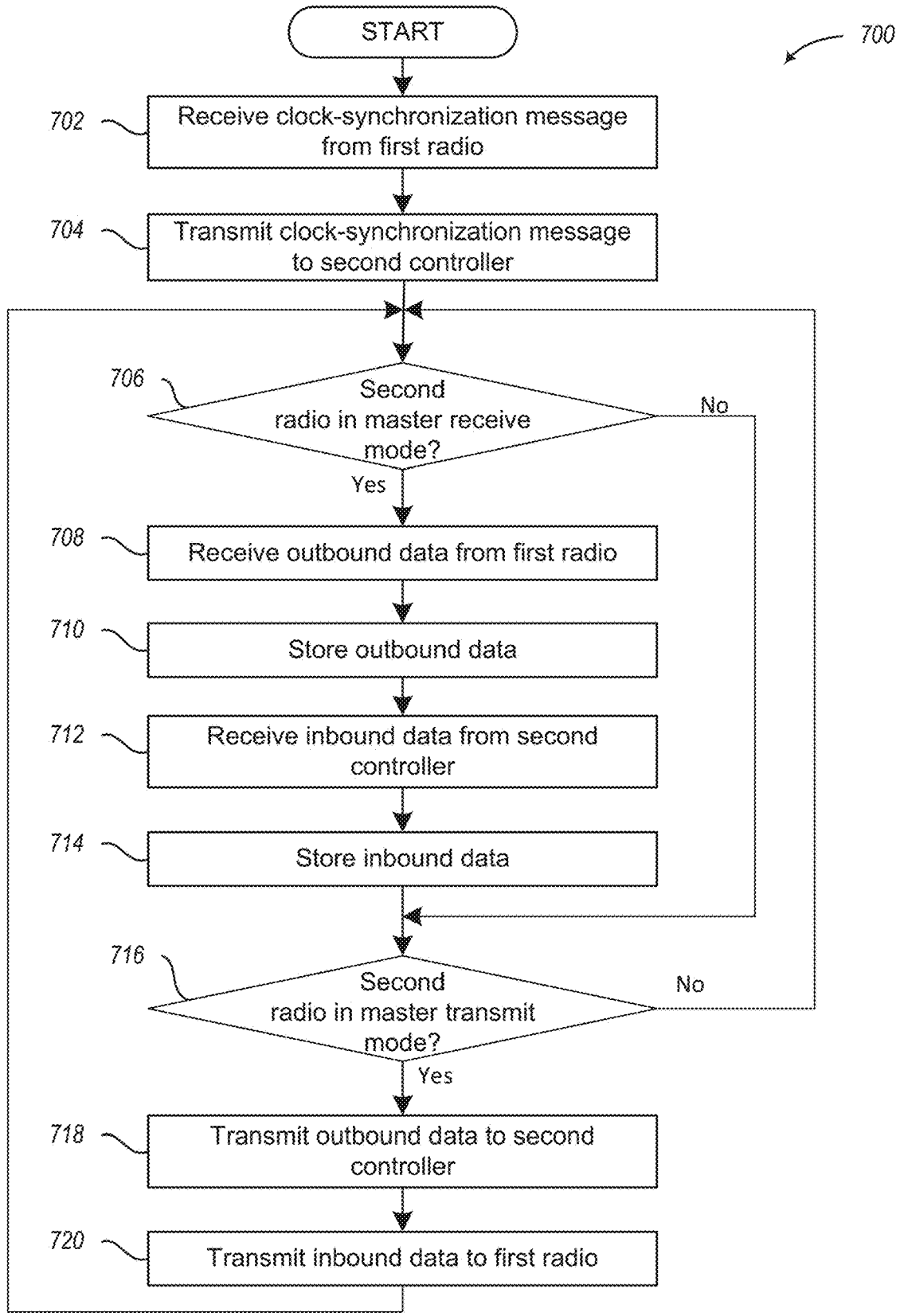
FIG. 7 shows a logical flow diagram of a process by a second radio of the second computing device for utilizing the fixed transmission window to send and receive data in accordance with embodiments described herein.

FIG. 7 shows a logical flow diagram of a process 700 by a second radio of the second computing device for utilizing the fixed transmission window to send and receive data in accordance with embodiments described herein. In various embodiments, process 700 may be implemented by or executed on one or more computing devices or circuitry, such as second radio 132 of the second computing device 102 in FIG. 1.

Process 700 begins, after a start block, at block 702, where a clock-synchronization message is received from the first radio 108.

Process 700 proceeds to block 704, where the clock-synchronization message is transmitted to the second controller 134.

Process 700 continues at decision block 706, where a determination is made whether the second radio 132 is in a master receive mode as defined by the clock-synchronization message. If the second radio 132 is in a master receive mode, then process 700 flows to block 708; otherwise, process 700 flows to decision block 716.

At block 708, the outbound data is received from the first radio 108.

Process 700 proceeds to block 710, where the outbound data is stored. As described herein, the outbound audio data is stored separate from the outbound control data so that transmission of the outbound control data is prioritized over the transmission of the outbound audio data.

Process 700 continues at block 712, where inbound data is received from the second controller 134.

Process 700 proceeds next to block 714, where the inbound data is stored. As described herein, the inbound audio data is stored separate from the inbound control data so that transmission of the inbound control data is prioritized over the transmission of the inbound audio data.

After block 714, or if the second radio 132 is not in a master receive mode at decision block 706, then process continues at decision block 716. At decision block 716, a determination is made whether the second radio 132 is in a master transmit mode as defined by the clock-synchronization message. If the second radio 132 is in a master transmit mode, then process 700 flows to block 718; otherwise, process 700 loops to block 706. In some embodiments, the second radio 132 may be in neither the slave transmit mode or the slave receive mode if the first computing device 102 loses communication with the second computing device 130. In other embodiments, the second radio 132 may be notified that the transmission windows have become out of synchronization and need to be reset. At which point, the second radio 132 may need to wait for an updated clock-synchronization message.

At block 718, the stored outbound data is transmitted to the second controller 134.

Process 700 proceeds next to block 720, where the stored inbound data is transmitted to the first radio 108. After block 720, process 700 loops to decision block 706.

Figure 8:
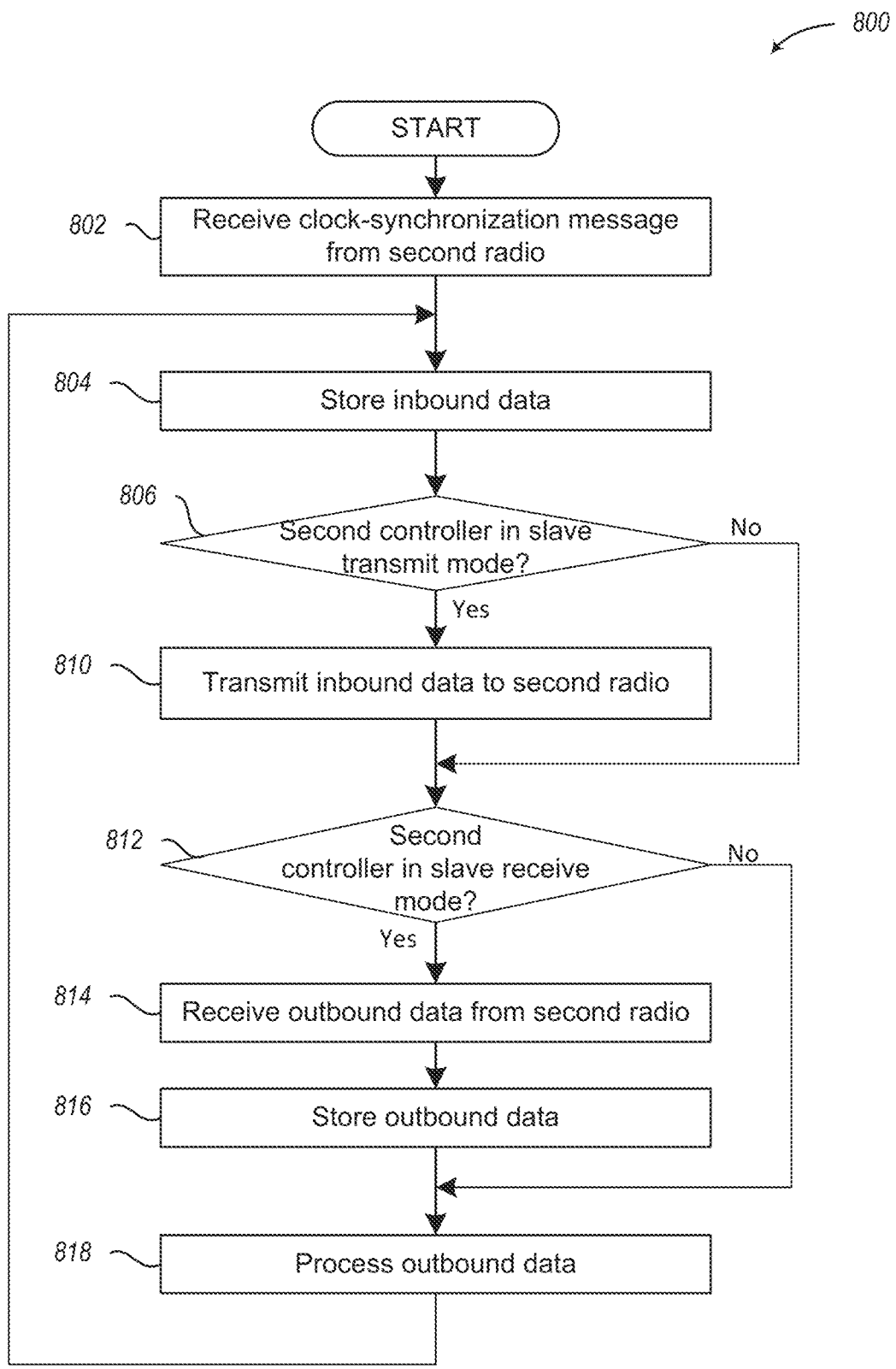
FIG. 8 shows a logical flow diagram of a process by a second controller of a second computing device for utilizing the fixed transmission windows to send and receive data in accordance with embodiments described herein.

FIG. 8 shows a logical flow diagram of a process 800 by a second controller of a second computing device for utilizing the fixed transmission windows to send and receive data in accordance with embodiments described herein. In various embodiments, process 800 may be implemented by or executed on one or more computing devices or circuitry, such as second controller 134 of the second computing device 102 in FIG. 1.

Process 800 begins, after a start block, at block 802, where a clock-synchronization message is received from the second radio 132.

Process 800 proceeds to block 804, where inbound audio data or control data or both is stored. In some situations, block 804 may be optional and may not be performed as there may be no inbound audio data or inbound control data to store. Moreover, in some embodiments, the storage of inbound data may be a background process and performed independent from process 800. As described herein, the inbound audio data and the inbound control data are stored in separate buffers such that the transmission of control data can be prioritized over the transmission of audio data.

Process 800 proceeds next to decision block 806, where a determination is made whether the second controller 134 is in a slave transmit mode as defined by the clock-synchronization message. If the second controller 134 is in a slave transmit mode, then process 800 flows to block 810; otherwise, process 800 flows to decision block 812.

At block 810, the stored inbound data is transmitted to the second radio 132.

After block 810 or if the second controller 134 is not in the slave receive mode, then process 800 proceeds to decision block 812. At decision block 812, a determination is made whether the second controller 134 is in a slave receive mode as defined by the clock-synchronization message. If the second controller 134 is in a slave receive mode, then process 800 flows to block 814; otherwise, process 800 flows to block 818.

In some embodiments, the second controller 134 may be in neither the slave transmit mode or the slave receive mode if the first computing device 102 loses communication with the second computing device 130. In other embodiments, the second controller 134 may be notified that the transmission windows have become out of synchronization and need to be reset. At which point, the second controller 134 may need to wait for an updated clock-synchronization message.

At block 814, the second controller 134 receives outbound data from the second radio 132.

Process 800 proceeds to block 816, where the second controller 134 stores the outbound data. As discussed herein, the outbound audio data may be stored in buffers separate from the outbound control data.

Process 800 continues at block 818, where the outbound data is processes. In some embodiments, the outbound audio data is output via a speaker embedded in or in communication with the second controller 134. In other embodiments, the outbound control data may be used to control one or more user interfaces, such as a haptic interface, LEDs, displays, etc.

After block 818, process 800 loops to block 804 to continue to store inbound data. As mentioned above, the storage of inbound data may be performed in parallel to process 800.

The following is a summarization of the claims as filed.

A system can be summarized as including: a first computing device having first circuitry and second circuitry; a second computing device having third circuitry and fourth circuitry. The first circuitry may be configured to: transmit a synchronization message to the second circuitry that defines a transmission window length; select first audio data to transmit to the second computing device based on a first priority for audio data relative to a second priority for control data and on the transmission window length; select first control data to transmit to the second computing device based on the second priority for control data relative to the first priority for audio data and on the transmission window length, wherein the second priority is higher than the first priority; and during a first transmission window, transmit the selected first audio data and the selected first control data to the second circuitry. The second circuitry may be configured to: transmit the synchronization message to the third circuitry; during the first transmission window, receive the selected first audio data and the selected first control data from the first circuitry; and during a second transmission window, transmit the selected first audio data and the selected first control data to the third circuitry. The third circuitry may be configured to: transmit the synchronization message to the fourth circuitry; during the second transmission window, receive the selected first audio data and the selected first control data from the second circuitry; and during the third transmission window, transmit the selected first audio data and the selected first control data to the fourth circuitry and transmit the selected second audio data and the selected second control data to the second circuitry. And the fourth circuitry may be configured to: during the third transmission window, receive the selected first audio data and the selected first control data from the third circuitry.

The system fourth circuitry that may be configured to: select second audio data to transmit to the first computing device based on the first priority for audio data relative to the second priority for control data and on the transmission window length; select second control data to transmit to the first computing device based on the second priority for control data relative to the first priority for audio data and on the transmission window length; and during the first transmission window, transmit the selected second audio data and the selected second control data to the third circuitry. The third circuitry may be configured to: during the first transmission window, receive the selected second audio data and the selected control data from the fourth circuitry. The second circuitry may be configured to: during the third transmission window, receive the selected second audio data and the selected second control data from the second computing device; and during the fourth transmission window, transmit the selected second audio data and the selected second control data to the first circuitry. The first circuitry may be configured to: during a fourth transmission window, receive selected second audio data and selected second control data from the second circuitry.

The system first circuitry may be configured to: during a fourth transmission window, receive selected second audio data and selected second control data from the second circuitry.

The system second circuitry may be configured to: during the third transmission window, receive selected second audio data and selected second control data from the second computing device; and during a fourth transmission window, transmit the selected second audio data and the selected second control data to the first circuitry.

The system third circuitry may be configured to: during the first transmission window, receive selected second audio data and selected control data from the fourth circuitry.

The system fourth circuitry may be configured to: select second audio data to transmit to the first computing device based on the first priority for audio data relative to the second priority for control data and on the transmission window length; select second control data to transmit to the first computing device based on the second priority for control data relative to the first priority for audio data and on the transmission window length; and during the first transmission window, transmit the selected second audio data and the selected second control data to the third circuitry.

The system first circuitry may be a master of the second circuitry and the second circuitry is a slave to the first circuitry.

The system third circuitry may be a master of the fourth circuitry and the fourth circuitry is a slave to the third circuitry.

The system first circuitry and the second circuitry may communicate via a serial peripheral interface.

The system third circuitry and the fourth circuitry may communicate via a serial peripheral interface.

The system second circuitry and the third circuitry may communicate via a radio frequency interface.

The system first circuitry and the second circuitry may communicate via a first serial peripheral interface, the third circuitry and the fourth circuitry communicate via a second serial peripheral interface, and the second circuitry and the third circuitry communicate via a radio frequency interface.

A method may be summarized as including: generating, by a first controller of a first computing device, a clock-synchronization message; transmitting, by the first controller, the clock-synchronization message to a first radio of the first computing device; transmitting, by the first controller, outbound data to the first radio when the first controller is in a first transmit mode based on the clock-synchronization message; transmitting, by the first radio, the clock-synchronization message to a second radio of a second computing device; transmitting, by the first radio, the outbound data to the second radio when the first radio is in a second transmit mode based on the clock-synchronization message; transmitting, by the second radio, the clock-synchronization message to a second controller of the second computing device; transmitting, by the second radio, the outbound data to the second controller when the second radio is in the first transmit mode based on the clock-synchronization message; and outputting, by the second controller, audio data from the outbound data and provide control data from the outbound data to at least one interface.

The method may include: transmitting, by the second controller, inbound data to the second radio when the second controller is in the second transmit mode based on the clock-synchronization message; transmitting, by the second radio, the inbound data to the first radio when the second radio is in the first transmit mode based on the clock-synchronization message; transmitting, by the first radio, the inbound data to the first controller when the first radio is in the second transmit mode based on the clock-synchronization message; and providing, by the first controller, the inbound data to another computing device.

The method may include: receiving, by the first controller, feedback from the second controller regarding variations of a transmission window defined by the clock-synchronization message; modifying, by the first controller, the clock-synchronization message based on the feedback; and transmitting, by the first controller, the modified clock-synchronization message to the first radio.

The method may include: receiving, by the first controller, feedback from the second radio regarding variations of a transmission window defined by the clock-synchronization message; modifying, by the first controller, the clock-synchronization message based on the feedback; and transmitting, by the first controller, the modified clock-synchronization message to the first radio.

The method may include: receiving, by the first controller, feedback from the first radio regarding variations of a transmission window defined by the clock-synchronization message; modifying, by the first controller, the clock-synchronization message based on the feedback; and transmitting, by the first controller, the modified clock-synchronization message to the first radio.

The method step of transmitting, by the first controller, outbound data to the first radio may include: selecting, by the first controller, outbound audio data and outbound control data stored by the first controller to transmit to the first radio based on the outbound control data having a higher priority compared to outbound audio data.

The method step of transmitting, by the first radio, the outbound data to the second radio may include: selecting, by the first controller, outbound audio data and outbound control data stored by the first radio to transmit to the second radio based on the outbound control data having a higher priority compared to outbound audio data.

The method step of transmitting, by the second radio, the outbound data to the second controller may include: selecting, by the second radio, outbound audio data and outbound control data stored by the second radio to transmit to the second controller based on the outbound control data having a higher priority compared to outbound audio data.

A computing device may be summarized as including: a first memory that stores first computer instructions; at least one first processor configured to execute the first computer instructions; a second memory that stores second computer instructions; and at least one second processor configured to execute the second computer instructions. Execution of the first computer instructions by the at least one first processor cause the first processor to: transmit a synchronization message to the at least one second processor; during a first transmission window defined by the synchronization message, transmit outbound audio data and outbound control data to the at least one second processor based on the outbound control data having a higher priority than the outbound audio data; during a second transmission window defined by the synchronization message, receive inbound audio data and inbound control data from the at least one second processor; and provide the inbound audio data and the inbound control data to third computing device. Execution of the second computer instructions by the at least one second processor cause the second processor to: transmit the synchronization message to the second computing device;

during the first transmission window defined by the synchronization message: receive the outbound audio data and the outbound control data from the at least one first processor; and receive the inbound audio data and the inbound control data from the second computing device; and during the second transmission window defined by the synchronization message: transmit the outbound audio data and the outbound control data to the second computing device based on the outbound control data having a higher priority than the outbound audio data; and transmit the inbound audio data and inbound control data to the at least one first processor.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

The headings and Abstract of the Disclosure provided herein are for convenience only and do not limit or interpret the scope or meaning of the embodiments. And the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a first computing device having first circuitry and second circuitry;
a second computing device having third circuitry and fourth circuitry;
wherein the first circuitry is configured to:
transmit a synchronization message to the second circuitry that defines a transmission window length;
select first audio data to transmit to the second computing device based on a first priority for audio data relative to a second priority for control data and on the transmission window length;
select first control data to transmit to the second computing device based on the second priority for control data relative to the first priority for audio data and on the transmission window length, wherein the second priority is higher than the first priority; and
during a first transmission window, transmit the selected first audio data and the selected first control data to the second circuitry;
wherein the second circuitry is configured to:
transmit the synchronization message to the third circuitry;
during the first transmission window, receive the selected first audio data and the selected first control data from the first circuitry; and
during a second transmission window, transmit the selected first audio data and the selected first control data to the third circuitry;
wherein the third circuitry is configured to:
transmit the synchronization message to the fourth circuitry;
during the second transmission window, receive the selected first audio data and the selected first control data from the second circuitry; and
during a third transmission window, transmit the selected first audio data and the selected first control data to the fourth circuitry and transmit the selected second audio data and the selected second control data to the second circuitry; and
wherein the fourth circuitry is configured to:
during the third transmission window, receive the selected first audio data and the selected first control data from the third circuitry.

2. The system of claim 1, comprising:
wherein the fourth circuitry is configured to:
select second audio data to transmit to the first computing device based on the first priority for audio data relative to the second priority for control data and on the transmission window length;
select second control data to transmit to the first computing device based on the second priority for control data relative to the first priority for audio data and on the transmission window length; and
during the first transmission window, transmit the selected second audio data and the selected second control data to the third circuitry;
wherein the third circuitry is configured to:
during the first transmission window, receive the selected second audio data and the selected control data from the fourth circuitry;
wherein the second circuitry is configured to:
during the third transmission window, receive the selected second audio data and the selected second control data from the second computing device; and
during a fourth transmission window, transmit the selected second audio data and the selected second control data to the first circuitry; and
wherein the first circuitry is configured to:
during the fourth transmission window, receive selected second audio data and selected second control data from the second circuitry.

3. The system of claim 1, wherein the first circuitry is configured to:
during a fourth transmission window, receive selected second audio data and selected second control data from the second circuitry.

4. The system of claim 1, wherein the second circuitry is configured to:
during the third transmission window, receive selected second audio data and selected second control data from the second computing device; and
during a fourth transmission window, transmit the selected second audio data and the selected second control data to the first circuitry.

5. The system of claim 1, wherein the third circuitry is configured to:
during the first transmission window, receive selected second audio data and selected control data from the fourth circuitry.

6. The system of claim 1, wherein the fourth circuitry is configured to:
select second audio data to transmit to the first computing device based on the first priority for audio data relative to the second priority for control data and on the transmission window length;

select second control data to transmit to the first computing device based on the second priority for control data relative to the first priority for audio data and on the transmission window length; and during the first transmission window, transmit the selected second audio data and the selected second control data to the third circuitry.

7. The system of claim 1, wherein the first circuitry is a master of the second circuitry and the second circuitry is a slave to the first circuitry.

8. The system of claim 1, wherein the third circuitry is a master of the fourth circuitry and the fourth circuitry is a slave to the third circuitry.

9. The system of claim 1, wherein the first circuitry and the second circuitry communicate via a serial peripheral interface.

10. The system of claim 1, wherein the third circuitry and the fourth circuitry communicate via a serial peripheral interface.

11. The system of claim 1, wherein the second circuitry and the third circuitry communicate via a radio frequency interface.

12. The system of claim 1, wherein the first circuitry and the second circuitry communicate via a first serial peripheral interface, the third circuitry and the fourth circuitry communicate via a second serial peripheral interface, and the second circuitry and the third circuitry communicate via a radio frequency interface.

13. A method, comprising:
generating, by a first controller of a first computing device, a clock-synchronization message;
transmitting, by the first controller, the clock-synchronization message to a first radio of the first computing device;
transmitting, by the first controller, outbound data to the first radio when the first controller is in a first transmit mode based on the clock-synchronization message;
transmitting, by the first radio, the clock-synchronization message to a second radio of a second computing device;
transmitting, by the first radio, the outbound data to the second radio when the first radio is in a second transmit mode based on the clock-synchronization message;
transmitting, by the second radio, the clock-synchronization message to a second controller of the second computing device;
transmitting, by the second radio, the outbound data to the second controller when the second radio is in the first transmit mode based on the clock-synchronization message; and
outputting, by the second controller, audio data from the outbound data and provide control data from the outbound data to at least one interface.

14. The method of claim 13, comprising:
transmitting, by the second controller, inbound data to the second radio when the second controller is in the second transmit mode based on the clock-synchronization message;
transmitting, by the second radio, the inbound data to the first radio when the second radio is in the first transmit mode based on the clock-synchronization message;
transmitting, by the first radio, the inbound data to the first controller when the first radio is in the second transmit mode based on the clock-synchronization message; and
providing, by the first controller, the inbound data to another computing device.

15. The method of claim 13, comprising:
receiving, by the first controller, feedback from the second controller regarding variations of a transmission window defined by the clock-synchronization message;
modifying, by the first controller, the clock-synchronization message based on the feedback; and
transmitting, by the first controller, the modified clock-synchronization message to the first radio.

16. The method of claim 13, comprising:
receiving, by the first controller, feedback from the second radio regarding variations of a transmission window defined by the clock-synchronization message;
modifying, by the first controller, the clock-synchronization message based on the feedback; and
transmitting, by the first controller, the modified clock-synchronization message to the first radio.

17. The method of claim 13, comprising:
receiving, by the first controller, feedback from the first radio regarding variations of a transmission window defined by the clock-synchronization message;
modifying, by the first controller, the clock-synchronization message based on the feedback; and
transmitting, by the first controller, the modified clock-synchronization message to the first radio.

18. The method of claim 13, wherein transmitting, by the first controller, outbound data to the first radio comprises:
selecting, by the first controller, outbound audio data and outbound control data stored by the first controller to transmit to the first radio based on the outbound control data having a higher priority compared to outbound audio data.

19. The method of claim 13, wherein transmitting, by the first radio, the outbound data to the second radio comprises:
selecting, by the first controller, outbound audio data and outbound control data stored by the first radio to transmit to the second radio based on the outbound control data having a higher priority compared to outbound audio data.

20. The method of claim 13, wherein transmitting, by the second radio, the outbound data to the second controller comprises:
selecting, by the second radio, outbound audio data and outbound control data stored by the second radio to transmit to the second controller based on the outbound control data having a higher priority compared to outbound audio data.

21. A computing device, comprising:
a first memory that stores first computer instructions;
at least one first processor configured to execute the first computer instructions;
a second memory that stores second computer instructions;
at least one second processor configured to execute the second computer instructions;
wherein execution of the first computer instructions by the at least one first processor cause the first processor to:
transmit a synchronization message to the at least one second processor;
during a first transmission window defined by the synchronization message, transmit outbound audio data and outbound control data to the at least one second processor based on the outbound control data having a higher priority than the outbound audio data;
during a second transmission window defined by the synchronization message, receive inbound audio data and inbound control data from the at least one second processor; and provide the inbound audio data and the inbound control data to a third computing device; and wherein execution of the second computer instructions by the at least one second processor cause the second processor to:

transmit the synchronization message to the second computing device;

during the first transmission window defined by the synchronization message:

receive the outbound audio data and the outbound control data from the at least one first processor; and receive the inbound audio data and the inbound control data from the second computing device; and during the second transmission window defined by the synchronization message:

transmit the outbound audio data and the outbound control data to the second computing device based on the outbound control data having a higher priority than the outbound audio data; and transmit the inbound audio data and inbound control data to the at least one first processor.

\* \* \* \* \*